US012679296B2

(12) United States Patent
Watanabe et al.

(10) Patent No.:  US 12,679,296 B2
(45) Date of Patent:        Jul. 14, 2026

(54) SHOCK ABSORBING DEVICE AND VEHICLE

(71) Applicant: NIFCO INC., Yokosuka (JP)

(72) Inventors: Yasuhiro Watanabe, Yokosuka (JP);
Shigeki Sakamoto, Yokosuka (JP)

(73) Assignee: NIFCO INC., Yokosuka (JP)

( * ) Notice:     Subject to any disclaimer, the term of this
patent is extended or adjusted under 35
U.S.C. 154(b) by 361 days.

(21) Appl. No.:     18/279,115

(22) PCT Filed:     Mar. 15, 2022

(86) PCT No.:     PCT/JP2022/011670
§ 371 (c)(1),
(2) Date:     Aug. 28, 2023

(87) PCT Pub. No.: WO2022/219996
PCT Pub. Date: Oct. 20, 2022

(65)          Prior Publication Data
US 2024/0132005 A1     Apr. 25, 2024
US 2024/0227709 A9     Jul. 11, 2024

(30)          Foreign Application Priority Data

Apr. 13, 2021     (JP) ................................. 2021-067872

(51) Int. Cl.
B60R 19/32          (2006.01)
B60R 19/24          (2006.01)
(Continued)
(52) U.S. Cl.
CPC .............. B60R 19/24 (2013.01); B60R 19/32
(2013.01); F16F 7/12 (2013.01); F16F 15/04
(2013.01)

(58) Field of Classification Search
CPC ... B60R 19/32; B60R 19/52; B60R 2019/525;
B60R 2019/527; B62D 21/15; B62D
21/152; B62D 25/08; B62D 25/082
(Continued)

(56)          References Cited

U.S. PATENT DOCUMENTS 3,671,068  A  *   6/1972  Gerhard .................. B60R 19/34
293/30
3,891,199  A  *   6/1975  Willich ...................... F16F 9/16
188/289

(Continued)

FOREIGN PATENT DOCUMENTS

JP          S58-032042 U       3/1983
JP          860-246974 A      12/1985
(Continued)

OTHER PUBLICATIONS

PCT/ISA/210, "International Search Report for PCT International
Application No. PCT/JP2020/011670," Jun. 7, 2022.

*Primary Examiner* — Gregory A Blankenship
(74) *Attorney, Agent, or Firm* — HAUPTMAN HAM,
LLP

(57)          ABSTRACT

A shock absorbing device according to one embodiment
includes an elastic member and an attenuation device. The
elastic member is compressed by a force transmitted from
the exterior of a vehicle through a front grill which is a
vehicle exterior component, and returns the front grill to the
vehicle exterior by means of the restoration force against the
compression. The attenuation device attenuates the speed of
the front grill when the front grill is being returned by the
restoration force of the elastic member.

7 Claims, 7 Drawing Sheets

(51) Int. Cl.
    *F16F 7/12*          (2006.01)
    *F16F 15/04*        (2006.01)

(58) Field of Classification Search
    USPC ............... 293/134–137; 296/187.03, 187.09,
                                    296/187.06
    See application file for complete search history.

(56)                 References Cited

U.S. PATENT DOCUMENTS

| | | | | |
|---|---|---|---|---|
| 4,235,317 | A * | 11/1980 | Maciejewski | F16F 9/303 |
| | | | | 267/152 |
| 5,029,919 | A * | 7/1991 | Bauer | F16F 9/0472 |
| | | | | 267/221 |
| 5,181,699 | A * | 1/1993 | Chang | F16F 9/16 |
| | | | | 267/221 |
| 5,593,195 | A * | 1/1997 | Lei | B60R 19/36 |
| | | | | 293/30 |
| 5,971,451 | A * | 10/1999 | Huang | B60R 19/18 |
| | | | | 293/121 |
| 6,224,120 | B1 * | 5/2001 | Eipper | B60R 19/52 |
| | | | | 293/118 |
| 6,312,028 | B1 * | 11/2001 | Wilkosz | B62D 21/152 |
| | | | | 293/133 |
| 6,467,836 | B1 * | 10/2002 | Miller | B60R 19/00 |
| | | | | 188/374 |
| 6,536,818 | B1 * | 3/2003 | Moss | B60R 19/32 |
| | | | | 293/133 |
| 6,976,718 | B2 * | 12/2005 | Nakanishi | B60R 19/40 |
| | | | | 293/118 |
| 8,016,332 | B1 * | 9/2011 | Shoap | B60R 19/30 |
| | | | | 293/118 |
| 8,864,197 | B2 * | 10/2014 | Schneider | H01Q 21/00 |
| | | | | 293/136 |
| 10,787,140 | B2 * | 9/2020 | Rastegar | B60R 19/40 |
| 2003/0178238 | A1 * | 9/2003 | Ruiz | B60R 19/36 |
| | | | | 180/274 |
| 2004/0032132 | A1 * | 2/2004 | Yang | B60R 19/38 |
| | | | | 293/118 |
| 2004/0211631 | A1 * | 10/2004 | Hsu | F16F 9/56 |
| | | | | 188/322.19 |
| 2016/0311389 | A1 * | 10/2016 | Sharma | B60K 28/14 |
| 2018/0251089 | A1 * | 9/2018 | Gao | B60R 19/36 |
| 2018/0257591 | A1 * | 9/2018 | Gao | B60R 19/28 |
| 2023/0286453 | A1 * | 9/2023 | Wang | F16F 13/007 |
| 2024/0132005 | A1 * | 4/2024 | Watanabe | B60R 19/24 |
| 2024/0227709 | A9 * | 7/2024 | Watanabe | B60R 19/24 |

FOREIGN PATENT DOCUMENTS

| | | | |
|---|---|---|---|
| JP | S62-000451 | U | 1/1987 |
| JP | S63-096337 | U | 6/1988 |
| JP | H10-109605 | A | 4/1998 |
| JP | 2000-142279 | A | 5/2000 |
| JP | 2013-221317 | A | 10/2013 |

* cited by examiner

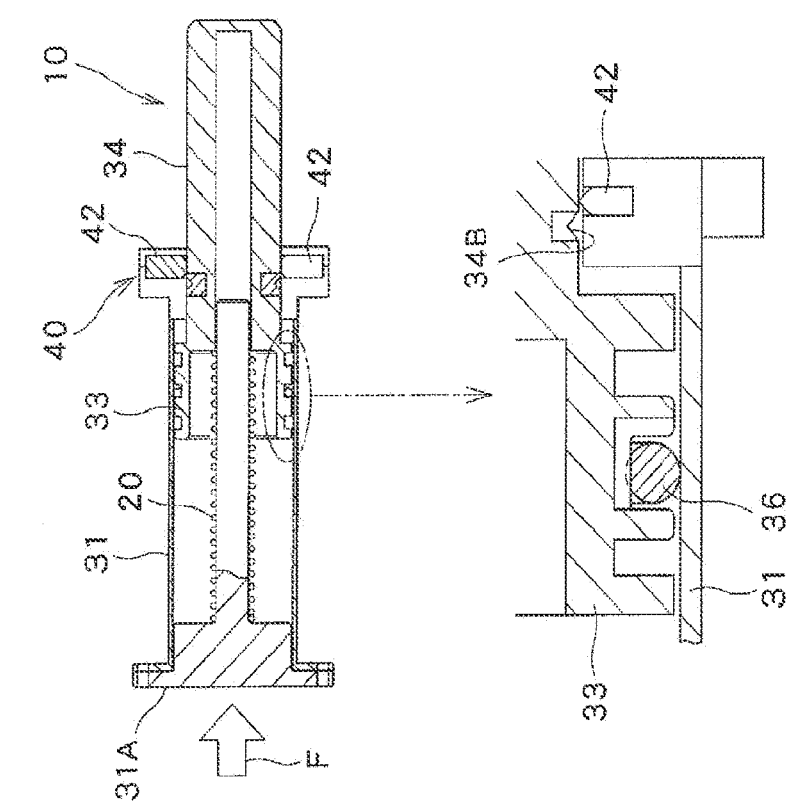

SHOCK ABSORBING DEVICE AND VEHICLE

RELATED APPLICATIONS

The present application is National Phase of International Application No. PCT/JP2022/011670 filed Mar. 15, 2022, and claims priority from Japanese Application No. 2021-067872, filed Apr. 13, 2021, the disclosure of which is hereby incorporated by reference herein in its entirety.

FIELD OF THE INVENTION

The present invention relates to a shock Absorbing device for absorbing impact applied to a vehicle exterior device and the like, and a vehicle equipped with the shock absorbing device.

BACKGROUND OF THE INVENTION

Recently, a radar device, such as ADAS (Advanced Driver Assist System) may be installed on a vehicle exterior device, such as a front grill or bumper.

There are various types of the radar device, for example, a radar device using millimeter waves includes a transmitting section for the millimeter waves and a receiving section for receiving reflection waves of the millimeter waves.

In case the vehicle exterior device, such as above, is fixed rigidly to a vehicle body and the radar device is rigidly fixed to the vehicle exterior device, when a shock is applied, the vehicle exterior device is easy to be deformed, and a relative position of the radar device relative to the vehicle exterior device is easy to be moved.

Then, in case the vehicle exterior device deforms or a relative position of the radar device is moved, it may be difficult to correctly detect by the radar device.

The deformation and the like of the vehicle exterior device may be suppressed by reducing a shock to the vehicle exterior device. As a technology for reducing a shock, JP 58-032042U discloses a device for reducing a shock applied to a bumper by a coil spring. JP 62-000451 discloses a device wherein a shock applied to a bumper is reduced by a spring, and a recovery operation of the spring pushed by the shock is restricted by a ratchet.

SUMMARY OF THE INVENTION

In the device of the Patent Document 1 for reducing the shock only by the spring, there is a possibility that the vehicle exterior device vigorously returns to an original position when the spring returns. Due to this return, the vehicle exterior device may once again receive a strong shock. And, due to this shock, a condition of the vehicle exterior device and the radar device attached to the vehicle exterior device may be damaged again.

On the other hand, in the Patent Document 2, a return of the spring which absorbed the shock is restricted by the ratchet, so that a second shock is reduced. However, in order to return the vehicle exterior device to the original position, it is necessary to release the engaging condition of the ratchet, to thereby take time.

By the conventional driver, it is considered that the release operation of the ratchet is hard to operate properly. In this situation, in case the radar device is attached to the vehicle exterior device, a driver must move the vehicle in a condition that the radar device does not function properly.

The present invention has been made in view of the above situation, and it is an object of the invention to provide an shock Absorbing device which can effectively protect a vehicle exterior device and/or accessories of the vehicle exterior device from a shock, and a vehicle equipped with the shock Absorbing device.

The shock absorbing device according to a configuration of the embodiment comprises an elastic member which is contracted by a force transferred from a vehicle outside through a vehicle exterior member and to return the vehicle exterior member to the vehicle outside by a restoration force against a contraction of the elastic member, and an attenuation device for attenuating a speed when the vehicle exterior device returns by the restoration force.

The attenuation device is an air damper forming an air chamber between a cylinder and a piston, the air damper attenuating a speed when the vehicle exterior member returns by an attenuation force of the air damper through a resistance generated by limiting an amount of air flowing from the air chamber to an outside of the air chamber by a movement of the piston.

The elastic member may be housed in the cylinder.

The shock absorbing device of the configuration of the embodiment further comprises an operation regulation device configured to operate such that when a force transferred from the vehicle exterior through the vehicle exterior device is less than a predetermined value, a contraction operation of the elastic member is limited, and when the force is more than the predetermined value, a contraction operation of the elastic member is permitted.

In the shock absorbing device according to the configuration of the embodiment, the shock absorbing device is configured to be installed between the vehicle exterior member to which a radar device and/or sensor is provided and a vehicle body.

A vehicle according to a configuration of the embodiment is provided with the above shock absorbing device.

The vehicle comprises a plurality of the shock absorbing devices, wherein attenuation forces generated by the plurality of the shock absorbing devices may be changed according to a kind of the vehicle exterior member and a position relative to the vehicle exterior member.

According to the invention, the vehicle exterior device and/or an accessory of the vehicle exterior device is effectively protected.

BRIEF DESCRIPTION OF THE DRAWINGS

FIGS. 6(A) and 6(B) are drawings explaining an operation of the shock absorbing device according to the one embodiment, wherein a state when the shock absorbing device absorbs a force from a vehicle outside is shown.

EMBODIMENTS OF THE INVENTION

Figure 1:
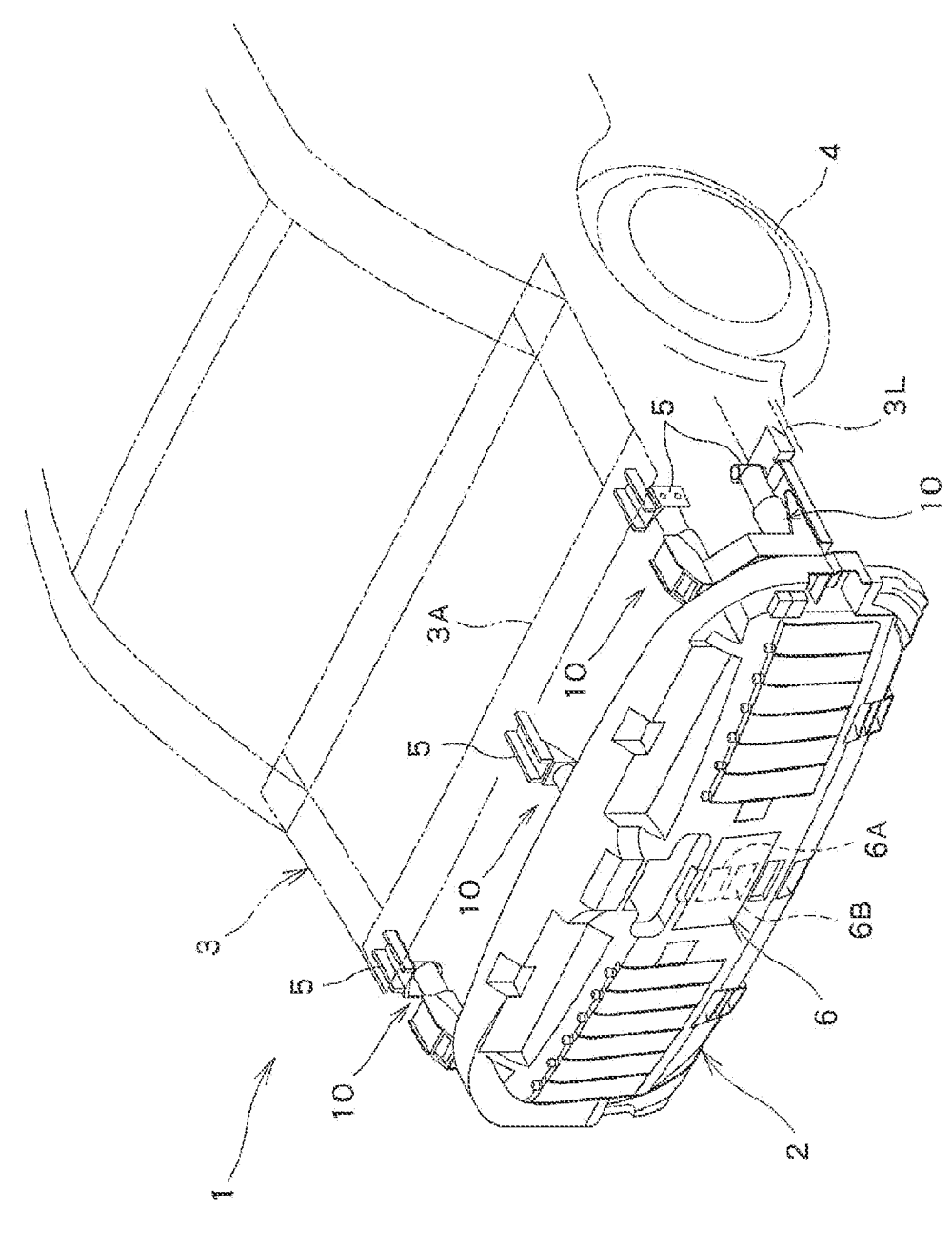
FIG. 1 is a perspective view of a part of a vehicle where a shock absorbing device according to one embodiment is attached between a front grill which is a vehicle exterior device and a vehicle body.

Hereinafter, one embodiment of the invention is explained with reference to the drawings. Incidentally, in the drawings attached to the specification, in view of the convenience to be understood easily, there is a situation where the size and the relation between the vertical and lateral directions are exaggerated from the actual one.

Vehicle

Figure 2:
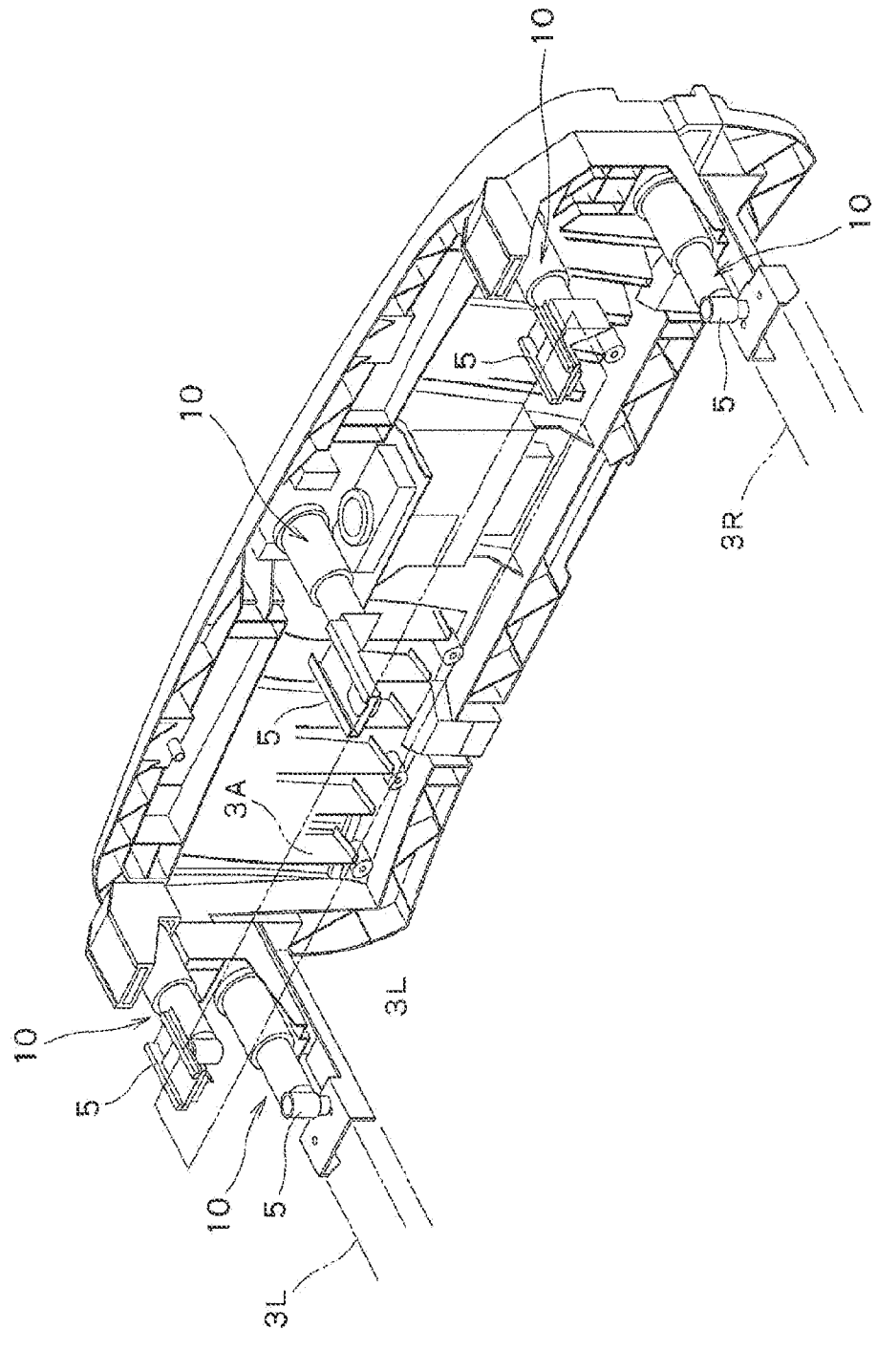
FIG. 2 is a perspective view of the shock absorbing device and the front grill according to the one embodiment in a view point different from FIG. 1.

FIG. 1 and FIG. 2 are perspective views of a part of a vehicle 1 equipped with a shock absorbing device 10 according to one embodiment of the invention. In the configuration of the embodiment, a plurality of shock absorbing devices is attached between a front grill 2 and a vehicle body 3.

In the example shown in the drawings, five shock absorbing devices 10 are provided. However, a number of the device is not especially limited. Also, a vehicle exterior device to which the shock absorbing device 10 is attached is not especially limited. The shock absorbing device 10 may be attached to, for example, a bumper, a fender and so on.

The vehicle body 3 is a frame portion supporting the vehicle exterior parts, a power source (an engine, motor and the like), wheels 4 and the like, and mainly is formed of a plurality of frames. FIGS. 1 and 2 show a front cross member 3A and a pair of left and right front side members 3L, 3R forming the vehicle body 3.

The front cross member 3A extends in left right direction at a front side of the vehicle body. One front side member 3L in the pair of the front side members 3L, 3R extends in the front back direction at the lower left side of the vehicle front portion. The other front side member 3R in the pair of front side members 3L, 3R extends in the front rear direction at the right lower side portion of the vehicle front portion.

In the example of the illustrated embodiment, the shock absorbing devices 10 are attached between the front cross member 3A and an upper portion of the front grill 2, between the front side member 3L and a left lower portion of the front grill 2, and between the front side member 3R and a right lower portion of the front grill 2.

As will be described later, the shock absorbing device 10 contracts by a force transferred from the vehicle outside through the vehicle exterior device, to thereby absorb the force, and extends by restoration force at the time of contraction after absorbing the force, so that the vehicle exterior device is returned to the former position.

In the illustrated shock absorbing device 10, one end in the contraction and extending direction is connected to the front grill 2, and the other end in the contraction and extending direction is connected to the vehicle body 3 through a bracket 5. Accordingly, the shock absorbing device 10 of the configuration of the embodiment is formed to absorb the force transferred from outside through the front grill 2.

In the configuration of the embodiment, in a condition where the above explained shock absorbing device 10 is attached, the load of the front grill 2 is supported by the vehicle body 3. Namely, the shock absorbing device 10 has a function of absorbing a force transferred from the outside, and a function supporting the vehicle exterior member to the vehicle body 3. Also, in the configuration of the embodiment, the direction of contraction and extension of the shock absorbing device 10 becomes a condition along the front and rear direction. However, the direction of the shock absorbing device 10 is not especially limited, and may be changed according to the corresponding vehicle exterior member.

Also, as shown in FIG. 1, the radar device 6 is provided at the center of the front grill 2. The radar device may be, for example a radar device of ADAS. The illustrated radar device 6 includes a transmitting section 6A transmitting detecting waves, and a receiving section 6B receiving reflecting waves of the detecting waves. The detecting waves may be millimeter waves, ultrasound waves, laser lights. Instead of or in addition to the radar device 6, a sensor, an imaging device and the like may be provided.

Shock Absorbing Device

Hereinafter, the shock absorbing device 10 is explained with reference to a side view of the shock absorbing device 10 shown in FIG. 3 and a section view of the shock absorbing device 10 shown in FIG. 4.

Figure 3:
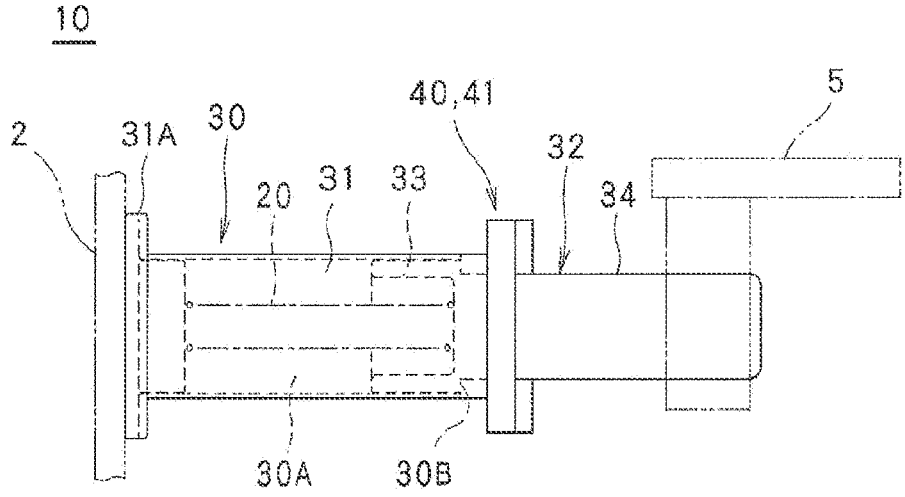
FIG. 3 is a side view of the shock absorbing device according to the one embodiment.
Figure 4:
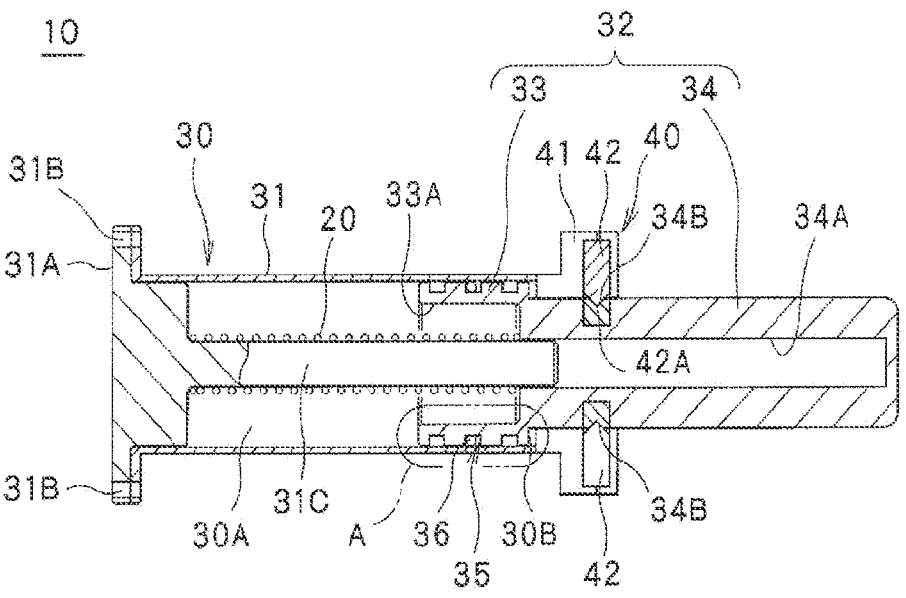
FIG. 4 is a vertical sectional view corresponding to the shock absorbing device according to the one embodiment shown in FIG. 3.

As shown in FIG. 3 and FIG. 4, the shock absorbing device 10 includes an elastic member 20, an attenuation device 30 and an operation regulation device 40.

The elastic member 20 contracts by a force transferred from an outside of the vehicle body through the front grill 2, and returns the front gill 2 to the vehicle outside by a restoration force against the contraction. The attenuation device 30, mainly, attenuates the speed at the time of return of the front grill 2 by the restoration force of the elastic member 20. Also, the operation regulation device 40 limits the operation of the shock absorbing device 10.

The attenuation device 30 of the embodiment is formed by, as an example, an air damper forming air chambers 30A, 30B between a cylinder 31 and a piston 32.

In the attention device 30, a piston 32 is inserted into a cylinder 31 in a cylindrical shape where on end is closed and the other end is open. The piston 32 is movable freely to reciprocate in an axial direction. Numeral 31A in FIG. 3 and FIG. 4 is a close plate closing one end of the cylinder 31. Incidentally, in the following, in case of simply referring to an axial direction, it means the axial direction of the cylinder.

The piston 32 includes a piston main body 33 received in the cylinder 31, and a piston rod 34 extending in the axial direction from a face of the piston main body 33 facing the other side of the cylinder 31. The piston rod 34 extends outside from the open portion of the other side of the cylinder 31, and a part thereof is exposed outside the cylinder 31.

As shown in FIG. 3, the bracket 5 explained before is attached to a portion exposed from outside of the cylinder 31 in the piston rod 34, and the attenuation device 30 is attached to the vehicle body 3 through the piston rod 34. On the other hand, the close plate 31A has a circular plate shape, and projects radially outside from the cylinder 31, and the projection portion includes a through hole 31B in the axial direction for passing a connection member. The attenuation device 30 is attached to the front grill 2 by the connection member which passes through the through hole 31B.

The piston main body 33 is formed with a dent 33A dented in the axial direction from the face at one side (left side of FIGS. 3 and 4) of the cylinder 31 to the other side (right side in FIGS. 3 and 4), and the piston rod 34 is formed with a guide hole 34A in the round shape in section extending in the axial direction from the center bottom of the dent 33A along an inside of the piston rod 34.

The close plate 31A of the cylinder 31 includes a guide bar 31C in the cylindrical shape extending in the axial direction in the cylinder 31, and the guider bar 31C is inserted slidably into the guide hole 34A through the dent 33A of the piston main body 33. Accordingly, the movement of the piston 32 in the axial direction is guided by the guide bar 31C.

Here, the elastic member 20 in the configuration of the embodiment is, as one example, a coil spring, and is externally mounted outside the guide bar 31C. Namely, the elastic member 20 is attached to the guide bar 31C such that the guide bar 31C passes through inside the elastic member 20. And, the elastic member 20 is provided between the close plate 31A and the piston main body 33 in a state where the elastic member 20 contacts at one end the close plate 31A and at the other end the bottom of the dent 33A. In this state, the elastic member 20 is received in the cylinder 31.

As stated above, the elastic member 20 is incorporated into the attenuation device 30, so that when the piston 32 relatively moves to the one end side of the cylinder 31 (close plate side 31A), the elastic member 20 can contract. Further, the elastic member 20 can relatively move the piston 32 to the other end side of the cylinder 31 (open side) by the restoration force to the contraction.

Accordingly, the elastic member 20 contracts by the force from the outside of the vehicle body through the front grill 2, permits the movement of the front grill 2 to the vehicle body 3 side, and returns the front grill 2 moved to the vehicle body 3 side to the outside of the vehicle body by the restoration force against the contraction.

Incidentally, in the configuration of the embodiment, the elastic member 20 is retained inside the cylinder 31, so that it has an advantage that enlargement of the attenuation device 30 is suppressed. However, the elastic member 20 may be provided outside the attenuation device 30.

In a condition where the piston 32 is inserted in the cylinder 31, as shown in FIG. 4, a first air chamber 30A and a second air chamber 30B are formed inside the cylinder 31. The first air chamber 30A is located at one end side of the cylinder 31 with the piston main body 33 therebetween, and the second air chamber 30B is located at the other end side with the piston main body 33 therebetween. Incidentally in the configuration of the embodiment, the first air chamber 30A is closed, and the second air chamber 30B opens to the outside of the cylinder 31 through, for example, a flow path, not shown. However, the second air chamber 30B may be opened, or closed.

The first air chamber 30A and the second air chamber 30B change the volumes according to the movement of the piston main body 33 in the axial direction. In the configuration of the embodiment, when the piston main body 33 moves relatively to the one end side (close plate 31A side) of the cylinder 31, the volume of the first air chamber 30A decreases, and the volume of the second air chamber 30B increases. At this time, air in the first air chamber 30A flows to the second air chamber 30 side. On the other hand, when the piston main body 33 relatively moves to the other end side (open side) of the cylinder 31, the volume of the first air chamber 30A increases, and the volume of the second air chamber 30B decreases. At this time, air in the second air chamber 30B flows to the first air chamber 30A side.

In case the piston main body 33 is moved as explained above, air moves between the first air chamber 30A and the second air chamber 30B. Here, when the piston main body 33 is relatively moved to the one end side of the cylinder 31 (close plate 31 side), the attenuation device 30 limits the amount of air flowing from the first air chamber 30A to the outside of the first air chamber 30A (second air chamber 30B side), so that resistance to the movement of the piston main body 33 is generated to generate the attenuation force. Also, when the piston main body 33 is relatively moved to the other end side (open side) of the cylinder 31, the attenuation device 30 limits the amount of air flowing from the inside of the second air chamber 30B to the outside of the second air chamber 30B, so that resistance relative to the movement of the piston main body 33 is generated to generate attenuation. In the configuration of the embodiment, when the front grill 2 returns, the piston main body 33 moves relatively to the other end side (open side). Accordingly, when the front grill 2 returns, the attenuation device 30 limits the amount of air flowing from the inside of the second air chamber 30B to the outside of the second air chamber 30B (first air chamber 30A side), so that the speed when the front grill 2 returns is attenuated.

Figure 5A:
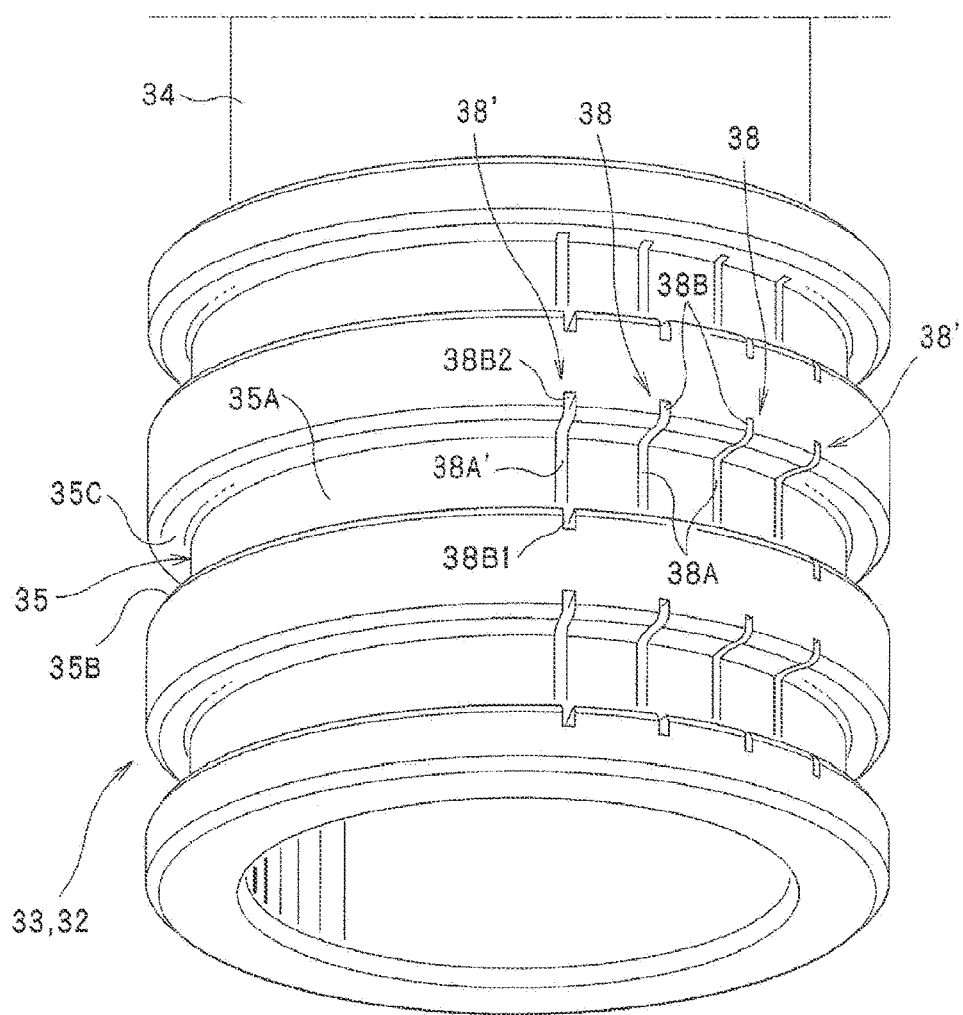
FIG. 5A is a perspective view of a piston forming the shock absorbing device according to the one embodiment.
Figure 5B:
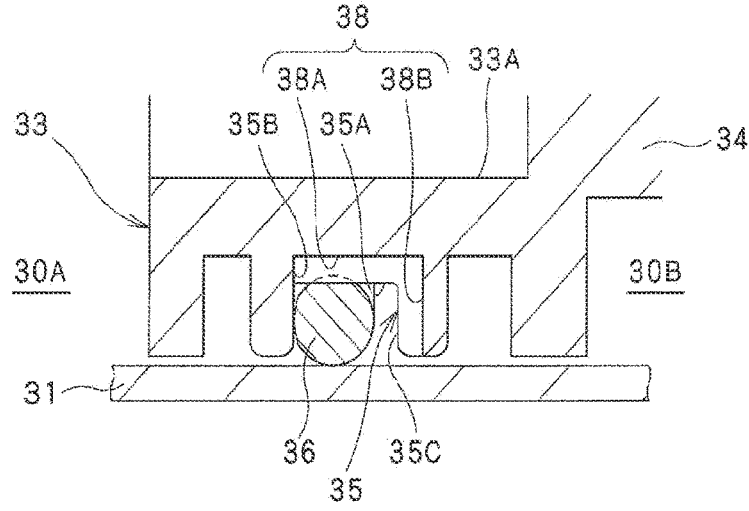
FIG. 5B is an enlarged view of FIG. 4, showing the piston and a seal member forming the shock absorbing device according to the one embodiment.

The limitation of the amount of air flowing inside and outside of the air chamber as explained above is made by a first air flow path 38 and a second air flow path 38', as explained later, formed in the piston main body 33. Hereinafter, this is explained. FIG. 5A is a perspective view of the piston 32, especially the piston main body 33. FIG. 5B is an enlarged view of an area A surrounded by two dotted lines in FIG. 4. As shown in FIGS. 5A and 5B, around an outer peripheral portion of the piston main body 33, an annular groove portion 35 extending around the entire peripheral portion is formed. And, in the groove portion 35, an O-ring 36 as a seal member made of an elastic material, for example a rubber such as made of a synthetic resin, is placed.

The groove portion 35 includes a bottom wall 35A, a first side wall 35B extending at a one end side of the cylinder 31 from the bottom wall 35A to an outside in the radial direction, and a second side wall 35C extending at the other end side of the cylinder 31 from the bottom wall 35A to the outer side in the radial direction. And, the O-ring 36 is attached in a condition to contact the bottom wall 35A and to contact an inner peripheral face of the cylinder 31. Also, the O-ring 36 is arranged in the groove portion 35 to be movable in the axial direction between the first side wall 35B and the second side wall 35C. On the other hand, an outer peripheral portion of the piston main body 33 does not contact an inner peripheral face of the cylinder 31.

As explained above, since the O-ring 36 is movable in the axial direction, in the configuration of the embodiment, the O-ring 36 can be movable between a first position (a position shown in FIG. 5B) contacting the first side wall portion 35B in the axial direction, and a second position (refer to FIG. 6(B)) contacting the second side wall 35C in the axial direction. The first position is formed when the piston main body 33 relatively moves to the other end side (open portion side) of the cylinder 31. The second position is formed when the piston main body 33 relatively moves to the one end side (close plate 31 side) of the cylinder 31.

Here in the configuration of the embodiment, as shown in FIG. 5A, the first air flow path 38 in an L-shape continuing to the bottom wall 35A and the second side wall 35C is formed in the groove portion 35, and the second air flow path 38' in a reverse C-shape continuing to the bottom wall 35A, the first side wall 35B and the second side wall 35C is formed in the groove portion 35.

As shown in FIG. 5A and FIG. 5B, the first air flow path 38 is formed by an axial direction path 38A dented in the radial direction from the bottom wall 35A to the inside and extending in the axial direction, and a radial direction path 38B dented in the axial direction from the second side wall 35C and extending in the radial direction. A number of the first air flow path 38 is not particularly limited, but in the example, four first air flow paths are formed. In detail, in a reverse side in a part of the piston main body 33 where the two first air flow paths 38 as shown in FIG. 5A are formed, further two first air flow paths 38 are formed.

Figure 5C:
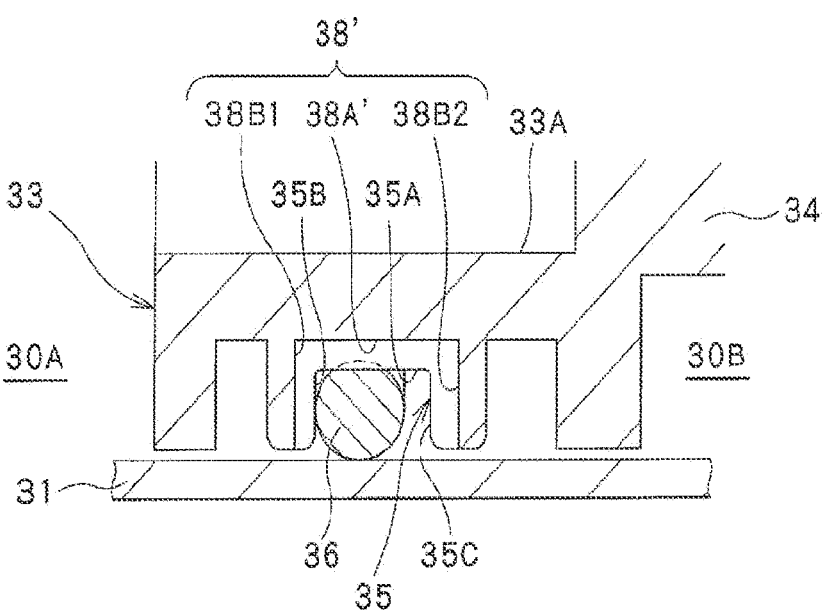
FIG. 5C is an enlarged view in section of an essential part of the shock absorbing device according to the present invention cut in a direction different from FIG. 4.

Also, FIG. 5C is a main part enlarged view of a section of the shock absorbing device 10 cut in a direction different from FIG. 4, and specifically, is a drawing when cutting on the second air flow path 38' in the axial direction.

As shown in FIG. 5A and FIG. 5C, a second air flow path 38' is formed by an axial direction path 38A' dented in the radial direction from the bottom wall 35A to an inside and extending in the axial direction, a first radial direction path 38B1 dented in the axial direction from the first side wall 35 and extending in the radial direction, and a second radial direction path 38B2 dented in the axial direction from the second side wall 35C and extending in the radial direction. A number of the second air flow path 38' is not particularly limited, but in the example, four second air flow paths are formed. In detail, in a reverse side of a part of the piston main body 33 where the two second air flow paths 38' are formed as shown in FIG. 5A, further two second air flow paths 38' are formed.

Since the first air flow path 38 and the second air flow path 38' as explained above are formed, an air communication condition between the first air chamber 30A and the second air chamber 30B is restricted by the first air flow path 38 and the second air flow path 38'. Accordingly, when the piston main body 33 is moved, an attenuation force relative to the movement of the piston main body 33 is formed.

Also, in the configuration of the embodiment, when the O-ring 36 is located in the first position as shown in FIG. 5B, an air flow from the second air flow chamber 30B to the first air flow chamber 30A through the first air flow path 38 is shut. At this time, as shown in FIG. 5C, an air flow from the second air chamber 30B to the first air chamber 30A through the second air flow path 38' is not shut. On the other hand, when the O-ring 36 is located in the second position, an air flow from the first air chamber 30A to the second air chamber 30B through the first air flow path 38 is permitted. Also, an air flow from the second air chamber 30B to the first air chamber 30A through the second air flow path 38' is not shut as in the first position.

Accordingly, when the O-ring 36 is located in the first position, an area of the air flow path connecting between the first air chamber 30A and the second air chamber 30B becomes smaller than an area of the air flow path when the O-ring 36 is located in the second position. Namely, in the attenuation device 30 of the configuration of the embodiment, according to the position of the O-ring 36, the area of the air flow path connecting the first air chamber 30A and the second air chamber 30B changes. Thereby, an attenuation force generated when the piston 32 relatively moves to the one end side (close plate 31A side) of the cylinder 31, and an attenuation force generated when the piston 32 relatively moves to the other end side ((open portion side) are changed.

As explained in detail, in the piston main body 33 which is going to relatively move to the other end side (open portion side) of the cylinder 31, the O-ring 36 comes to the first position, and the area of the air flow path connecting the first air chamber 30A and the second air chamber 30B becomes small, so that air is hard to flow to receive a large attenuation force. On the other hand, an attenuation force where the piston main body 33 receives when the piston main body 33 is going to relatively move to the one end side (closed plate 31A side) becomes smaller than that in the first position, since the O-ring 36 is located in the second position.

In detail, when a force from the vehicle outside is received through the front grill 2, the attenuation force by the attenuation device 30 does not operate largely, and when the front grill 2 is returned to the front side of the vehicle by the restoration force of the elastic member 20 contracted by the force from outside the vehicle, the attenuation force by the attenuation device 30 operates largely. Accordingly, it is intended to recover the front grill 2 gently.

On the other hand, when the force transmitted from the outside of the vehicle through the front grill 2 is less than a predetermined value, the operation regulation device 40 limits the contraction operations of the elastic member 20 and the attenuation device 30, and when the above force is more than the predetermined value, the contraction operations of the elastic member 20 and the attenuation device 30 are permitted. Incidentally, a contraction operation of the attenuation device 30 means, in the configuration of the embodiment, an operation where the piston 32 relatively moves to the one end side of the cylinder 31.

As shown in FIG. 4, the operation regulation device 40 in the configuration of the embodiment includes a housing 41 which is fixed to the open portion side of the cylinder 31 and is located outside the piston rod 34 in the radial direction, and engaging members 42 which are held by the housing 41 and are engaged with the piston rod 34.

Engaging members 42 are inserted such that ends 42A on the piston rod 34 side are inserted into dents 34B formed on an outer side of the piston rod 34, so that the engaging members 42 are engaged. An end 42A of the engaging member 42 is formed to taper forward, and is formed to recede outward in the radial direction (side away from the piston rod 34). Accordingly, when the engaging member 42 receives a force which moves the cylinder 31 and the housing 41 integrally formed toward the vehicle body 3 side, i.e. when a force to relatively move the piston 32 to one end side of the cylinder 31, a component of a force toward outward in the radial direction is received.

And, when a force to move the cylinder 31 and the housing 41 toward the vehicle body 3 side exceeds a predetermined value, the engaging members 42 disengage from the dent 34B. Accordingly, the movements of the cylinder 31 and the housing 41 to the vehicle body 3 side are permitted. In this case, the contraction operations of the elastic member 20 and the attenuation device 30 are permitted. According to the above operation regulation device 40, it is possible to suppress the movement of the front grill 2 with a light force.

Incidentally, the engagement members 42 may be an integrated member made of a ball plunger and a synthetic material. In case of the ball plunger, an engagement condition is released by receding the ball portion, and in case of the synthetic material, the engagement is released by deformation.

Operation

Next, the operation of the shock absorbing device 10 provided with the above structure is explained with reference to FIGS. 6(A), 6(B) and FIGS. 7(A), 7(B).

In FIGS. 6(A), 6(B), 7(A), 7(B), the shocking absorbing devices 10 are shown in the upper sections, and in the lower sections, conditions around the O-ring 36 corresponding to the conditions of the shock absorbing devices 10 in the upper sections are shown.

For example, when an object hits the front grill 2, as shown in numeral F in FIG. 6(A), a force is transferred from the vehicle outside to the shock absorbing device 10 through the front grill 2. When the force F exceeds the predetermined value, as shown in FIG. 6(A), engagement conditions of the engagement members 42 of the operation regulation device 40 with the piston rod 34 is released, so that contraction operations of the elastic member 20 and the attenuation device 30 according to the force F are permitted.

When the contraction operations of the elastic member 20 and the attenuation device 30 are permitted, as shown in FIGS. 6(B), in the configuration of the present embodiment, the cylinder 31 is pushed into the vehicle body 3 side. At this time, the piston main body 33 relatively moves to the one end side (close plate 31A side) of the cylinder 31. Along with the relative movement of the piston main body 33, the elastic member 20 contracts to thereby absorb the force F.

Also, at this time, as shown in FIG. 6(B), the O-ring 36 comes to the second position, and as shown in an arrow a1, an air flow from the first air chamber 30A to the second air chamber 30B through the first air flow path 38 is permitted. Also, not shown in the drawings, the air flow from the first air chamber 30A to the second air chamber 30B through the second air flow path 38' is permitted. Accordingly, the attenuation force against the force F by the attenuation device 30 does not operate largely. In this case, a large counter force where the front grill 2 receives from the shock absorbing device 10 is avoided, and it is possible at an early stage to avoid a condition where the front grill 2 is damaged.

Figures 7A, 7B:
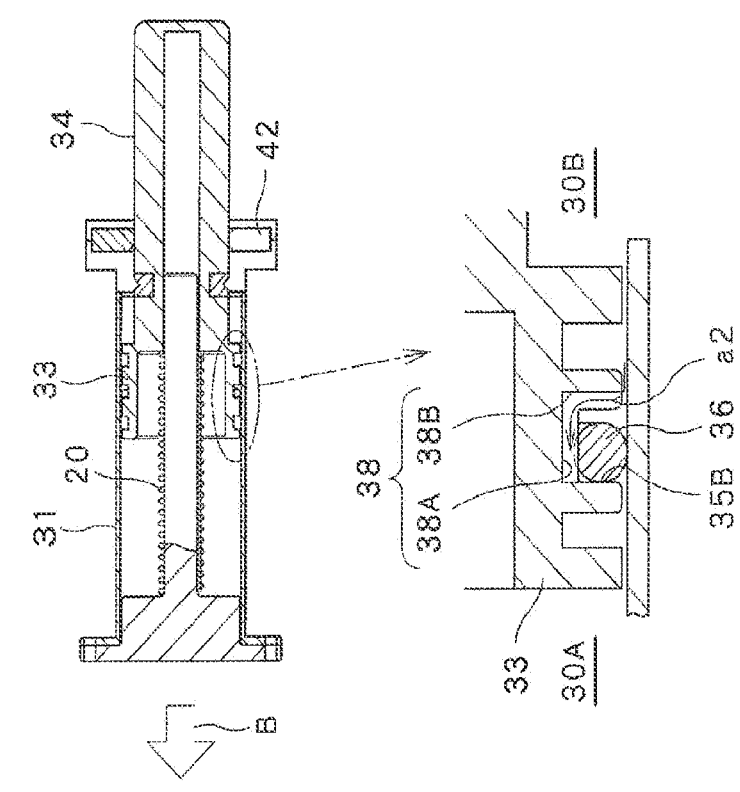
FIGS. 7(A) and 7(B) are drawings explaining an operation of the shock absorbing device according to the one embodiment, and show a state wherein the shock absorbing device returns to a condition before the force is applied by the restoration force by the force from the outside of the vehicle.

And, after the elastic member 20 absorbs the force F, the elastic member 20 stops the contraction operation. Therefore, as shown in FIG. 7(A), the elastic member 20 moves the cylinder 31 to the outside of the vehicle body by the restoration force generated by the contraction. Accordingly, the front grill 2 is returned to the former position toward a direction of an arrow B. At this time, the piston main body 33 is relatively moved to the other end side (open portion side) of the cylinder 31, and as shown in FIG. 7(A), the O-ring 36 becomes the first position.

At the first position, the air flow from the first air chamber 30A to the second air chamber 30B through the second air flow path 38' is permitted, but as shown in an arrow a2 in FIG. 7(A), the air flow from the second air chamber 30B to the first air chamber 30A through the first air flow path 38 is shut down. Accordingly, the area of the air flow path is further restricted more than that in the pushing portion, and as a result, an area of the air flow path is further reduced when pushing the piston, and as a result, a large attenuation force by the attenuation device 30 is applied to the restoration force of the elastic member 20. Accordingly, a speed when the front grill 2 returns is attenuated by the large attenuation force, and it is possible to return the front grill 2 gently.

Thereafter, as shown in FIG. 7(B), the elastic member 20 extends to the end, and the engaging condition between the engaging member 42 of the operation regulation device 40 and the piston rod 34 is returned. Accordingly, the front grill 2 returns to the original position.

According to the shock absorbing device 10 in the configuration of the embodiment as explained above, the force transmitted from the vehicle outside through the front grill 2 is absorbed by the contraction of the elastic member 20, so that it is possible to protect the front grill effectively right after the force is received. Also, when the front grill 2 is returned to the former position by the restoration force of the elastic member 20 due to the contraction of the elastic member 20, the attenuation force due to the attenuation device 30 operates, so that it is possible to reduce the speed when the front grill 2 returns. Accordingly, a situation where a shock is once again applied when the front grill 2 returns rapidly is effectively avoided. Also, since the front grill 2 returns to the correct position or the position close thereto by the restoration force of the elastic member 20, the front grill 2 and the attached radar device 6 can function at a correct or almost correct condition. Accordingly, the vehicle exterior parts and/or the accessory of the vehicle exterior parts can be effectively protected from the shock.

Incidentally, in the configuration of the embodiment, a plurality of shock absorbing devices is provided between the front grill 2 and the vehicle body 3. In this case, the attenuation forces generated by the plurality of shock absorbing devices 10 may be changed according to the locations relative to the front grill 2. For example, as shown in FIG. 1 and FIG. 2, in case a number of the shock absorbing devices 10 attached to an upper side of the front grill 2 and a number of the shock absorbing devices 10 attached to a lower side of the front grill 2 are different, attenuation forces of the shock absorbing devices attached to the upper side may be changed to attenuation forces of the shock absorbing devices attached to the lower side.

Also, it is considered to provide a configuration such that the shock absorbing devices 10 are attached between the front grill 2 and the vehicle body 3, and the shock absorbing devices may be attached between a bumper and the vehicle body 3. In this case, according to a kind of a corresponding vehicle exterior device (front grill 2 or bumper), in detail, according to a hardness and a weight of the parts, attenuation forces of the shock absorbing devices 10 may be changed.

As explained above, the configuration of the embodiment of the invention has been explained, but the configuration of the embodiment is indicated as an example, and in the above configuration, various replacements, changes and so on may be made. These modified examples are included in the present invention.

For example, the attenuation device 30 in the configuration of the embodiment generates the attenuation force by both a force when the elastic material 20 is contracted and a restoration force when the elastic material 20 extends. However, the attenuation device 30 may generate the attenuation force only when the elastic member 20 extends by the restoration force thereof. Also, the attenuation device 30 in the above configuration of the embodiment is an air damper, but it may be, for example, an oil damper, a magnetic damper and so on. However, the air damper .s advantageous in a point of kindness to environment and high reliability.

What is claimed is:

1. A shock absorbing device, comprising:
   an elastic member which is configured to be contracted by a force transferred from a vehicle outside through a vehicle exterior member and to return the vehicle exterior member to the vehicle outside by a restoration force against a contraction of the elastic member, and
   an attenuation device for attenuating a speed when the vehicle exterior member returns by the restoration force, wherein
   the attenuation device includes an air damper forming a first air chamber at one end side of a cylinder with a piston therebetween and a second air chamber at the other end side of the cylinder with the piston therebetween,
   the attenuation device is configured to generate:

a first attenuation force by limiting an amount of air flowing from the first air chamber to the second air chamber in response to a movement of the piston when the elastic material is contracted by a force from the outside the vehicle, and a second attenuation force through a resistance generated by limiting an amount of air flowing from the second air chamber to the first air chamber in response to a movement of the piston when the vehicle exterior member is returned by a restoration force of the elastic member which has been contracted by the force from the outside the vehicle, and the first attenuation force is different from the second attenuation force.

2. The shock absorbing device according to claim 1, wherein the elastic member is housed in the cylinder.

3. The shock absorbing device according to claim 1, further comprising an operation regulation device configured to operate such that when a force transferred from the vehicle exterior through the vehicle exterior member is less than a predetermined value, a contraction operation of the elastic member is limited, and when the force is more than the predetermined value, a contraction operation of the elastic member is permitted.

4. The shock absorbing device according to claim 1, wherein the shock absorbing device is configured to be installed between the vehicle exterior member to which a radar device and/or sensor is provided and a vehicle body.

5. A vehicle provided with a shock absorbing device, comprising:

an elastic member which is configured to be contracted by a force transferred from a vehicle outside through a vehicle exterior member and to return the vehicle exterior member to the vehicle outside by a restoration force against a contraction of the elastic member, and an attenuation device for attenuating a speed when the vehicle exterior member returns by the restoration force, wherein the attenuation device includes an air damper forming a first air chamber at one end side of a cylinder with a piston therebetween and a second air chamber at the other end side of the cylinder with the piston therebetween, the attenuation device is configured to generate:

a first attenuation force by limiting an amount of air flowing from the first air chamber to the second air chamber in response to a movement of the piston when the elastic material is contracted by a force from the outside the vehicle, and a second attenuation force through a resistance generated by limiting an amount of air flowing from the second air chamber to the first air chamber in response to a movement of the piston when the vehicle exterior member is returned by a restoration force of the elastic member which has been contracted by the force from the outside the vehicle, and the first attenuation force is different from the second attenuation force.

6. The vehicle according to claim 5, comprising a plurality of the shock absorbing devices, wherein attenuation forces generated by the plurality of the shock absorbing devices are changed according to a kind of a vehicle exterior member corresponding thereto and a position relative to the vehicle exterior member.

7. The shock absorbing device according to claim 1, wherein the second attenuation force is larger than the first attenuation force.

* * * * *